United States Patent Office 2,864,737
Patented Dec. 16, 1958

2,864,737

METHODS OF DESTROYING FUNGI

Ellis Kirby Fields, Chicago, Ill., and Roger W. Watson and Melvern C. Hoff, Highland, Ind., assignors to Standard Oil Company, Chicago, Ill., a corporation of Indiana No Drawing. Application September 13, 1954
Serial No. 455,768

7 Claims. (Cl. 167—22)

The present invention is directed to fungicidal compositions comprising novel heavy metal derivatives of phosphorous sulfide-hydrocarbon reaction product. More particularly, it concerns fungicidal compositions comprising molybdenum and vanadium containing derivatives of such phosphorous sulfide-hydrocarbon reaction product.

It has heretofore been discovered that certain reaction products of a phosphorous sulfide and a hydrocarbon, particularly a hydrocarbon such as an olefin or olefin polymer, when added to lubricants such as a hydrocarbon oil, in small amounts, are effective in inhibiting the formation of varnish, sludge, carbon and the like during the use of such lubricants. The preparation of such reaction products is described in U. S. 2,315,529, granted to Charles D. Kelso, and in U. S. 2,316,078, granted to Clarence M. Loane and James W. Gaynor, which issued on April 6, 1943. It has recently been found that certain novel heavy metal derivatives of such products are valuable additives for use in extreme pressure lubricants.

In our copending application for Letters Patent, S. N. 328,821, filed December 30, 1952, which issued as U. S. 2,758,089 on August 7, 1956, of which the present application is a continuation-in-part, those novel heavy metal derivatives of phosphorous sulfide-hydrocarbon reaction products prepared by reacting hydrogen peroxide, a molybdenum or vanadium compound affording an oxide of the respective metal under reaction conditions and a phosphorous sulfide-hydrocarbon reaction product are described and claimed. It has now been discovered that these materials which have proven excellent as lubricant additives have surprisingly effective fungicidal characteristics.

Thus, as described in the aforementioned copending application, phosphorous sulfide-hydrocarbon reaction products of the type hereinafter described in detail may be reacted with hydrogen peroxide and a compound of molybdenum or vanadium which affords an oxide of the respective metal under reaction conditions. Suitable metal derivatives are the oxides or sulfides of molybdenum or vanadium, the salts of molybdic or vanadic acids with various weak bases, etc. Without being bound by any theory herein expressed or implied, it is believed that the oxides once formed in the reaction mixture ultimately reacted in the form of molybdic or vanadic acids. The oxides, particularly the trioxides, of molybdenum and vanadium are preferred for use in accordance herewith. The novel compositions produced have been found to be particularly useful as extreme pressure additives in lubricants. It is preferred to employ reaction products of a phosphorous sulfide with olefin polymers, preferably butylene-isobutylene polymers of the type hereinafter described. As will be apparent, however, reaction products of phosphorous sulfide with various other hydrocarbons may also be employed. The reaction of the phosphorous sulfide-hydrocarbon reaction product with a metal compound and hydrogen peroxide occurs readily at temperatures in the range of from about 25° F. to about 200° F. and preferably from about 70° F. to 130° F. A reaction time of from about 2 to 14 hours and preferably from about 4 to 10 hours has been found to be particularly desirable. Quantities of the various reactants may vary over a relatively wide range; these will be referred to in detail in the ensuing description of the invention. The exact nature of the products obtained in accordance with such a reaction is not fully understood. It is believed, however, that the products are very stable complexes.

Phosphorous sulfide-hydrocarbon reaction products of the type which may be employed in accordance herewith may be readily obtained by reacting a phosphorous sulfide with a hydrocarbon at a temperature of from about 200° F. to about 600° F., and preferably from about 250° F. to 500° F., using from about 1% to about 50%, and preferably from about 5% to about 25%, by weight, of the phosphorous sulfide in the reaction. It is advantageous to maintain a non-oxidizing atmosphere, such as for example, an atmosphere of nitrogen above the reaction mixture. Usually, it is preferable to use an amount of the phosphorous sulfide that will completely react with the hydrocarbon so that no further purification becomes necessary; however, an excess of phosphorous sulfide can be used and separated from the product by filtration or by dilution with a solvent such as hexane, filtering and subsequently removing the solvent by suitable means, such as by distillation. The phosphorous sulfide-hydrocarbon reaction products contain both sulfur and phosphorous. The reaction product may be further treated by blowing with steam or nitrogen at an elevated temperature of from about 200° F. to about 600° F. to improve the odor. This steaming is effective to hydrolyze the products and such hydrolyzed products are particularly suitable for use in accordance herewith. The reaction may, if desired, be carried out in the presence of an additional sulfurizing agent or the phosphorous sulfide-hydrocarbon reaction product can be sulfurized, as described in U. S. 2,316,087, issued April 6, 1943, to James W. Gaynor and Clarence M. Loane.

The hydrocarbon constituent of this reaction is preferably a mono-olefin hydrocarbon polymer resulting from the polymerization of low molecular weight mono-olefinic hydrocarbons or isomono-olefinic hydrocarbons, such as propylene, butylenes, and amylenes, or the copolymers obtained by the polymerization of hydrocarbon mixtures containing isomono-olefins and mono-olefins of less than six carbon atoms. The polymers may be obtained by the polymerization of these olefins or mixtures of olefins in the presence of a catalyst, such as sulfuric acid, phosphoric acid, boron fluoride, aluminum chloride or other similar halide catalysts of the Friedel-Crafts type.

The polymers employed are preferably mono-olefin polymers or mixtures of mono-olefin polymers and isomono-olefin polymers having molecular weights ranging from about 150 to about 50,000 or more, and preferably from about 300 to about 10,000. Such polymers can be obtained, for example, by the polymerization in the liquid phase of a hydrocarbon mixture containing mono-olefins and isomono-olefins such as butylene and isobutylene at a temperature of from about —80° F. to about 100° F. in the presence of a metal halide catalyst of the Friedel-Crafts types such as, for example, boron fluoride, aluminum chloride, and the like. In the preparation of these polymers we may employ, for example, a hydrocarbon mixture containing isobutylene, butylenes and butanes recovered from petroleum gases, especially those gases produced in the cracking of petroleum oils in the manufacture of gasoline. U. S. 2,407,873 to Evering et al. describes a particularly suitable technique for polymerizing such olefins in the presence of an aluminum-chloride-hydrocarbon complex catalyst.

Essentially paraffinic hydrocarbons such as bright stock residuums, lubricating oil distillates, petrolatums or paraffin waxes may be used. The condensation products of any of the foregoing hydrocarbons or their halogen derivatives, with aromatic hydrocarbons can also be employed.

Examples of high molecular weight olefinic hydrocarbons which can be employed as reactants are cetene ($C_{16}$), cerotene ($C_{26}$), melene ($C_{30}$), and mixed high molecular weight alkenes obtained by cracking petroleum oils. Other olefins suitable for the preparation of the herein described phosphorous sulfide reaction products are olefins having at least 20 carbon atoms in the molecule of which from about 12 carbon atoms to about 18 carbon atoms, and preferably at least 15 carbon atoms, are in a long chain. Such olefins can be obtained by the dehydrogenation of paraffins, such as by the cracking of paraffin waxes, or by the dehalogenation of alkyl halides, preferably long chain alkyl halides, particularly halogenated paraffin waxes.

Also contemplated within the scope of the present invention are the reaction products of a phosphorous sulfide with aromatic hydrocarbons such as benzene, naphthalene, anthracene, toluene, diphenyl, etc., and alkylated aromatic hydrocarbon such as, for example, an alkyl benzene characterized by having at least one alkyl group of at least four carbon atoms, and preferably at least eight carbon atoms such as a long chain paraffin wax.

The phosphorous sulfide reactant can be any phosphorous sulfide, such as for example $P_2S_3$, $P_4S_3$, $P_4S_7$, and preferably $P_2S_5$.

The metallic compounds preferably employed in accordance herewith are those affording oxides of molybdenum or vanadium under reaction conditions. Such compounds include the oxides and sulfides of molybenum and vanadium and the salts of molybdic or vanadic acid with weak bases, etc. For purposes of the present invention, a weak base shall be defined as one having a dissociation constant of about $1 \times 10^{-3}$ or lower. Examples of such bases particularly suitable for forming salts with molybdic or vanadic acids are ammonium hydroxide, triethylammonium hydroxide, etc. Of the oxides of molybdenum, molybdenum trioxide is preferably employed although other oxides of molybdenum such as molybdenum dioxide and molybdenum sesquioxide, may also be employed. Similarly, the various oxides of vanadium are suitable, the trioxide, however, being preferred in each instance. The amount of metal compound which may be combined with the phosphorous sulfide-hydrocarbon reaction product varies with the particular reaction product employed as well as the quantity of $H_2O_2$ present as will hereinafter be referred to. Thus, the ratio, on a weight basis, of metal compound to phosphorous sulfide-hydrocarbon reaction product may be from about 1:1 to about 1:40 and preferably from about 1:3 to about 1:20.

Hydrogen peroxide is preferably employed in an aqueous solution in accordance herewith. Thus, it has been found most satisfactory to employ a solution of hydrogen peroxide containing from about 5% to about 90% hydrogen peroxide and preferably from about 15 to about 50%. The amount of peroxide employed, calculated as 100% hydrogen peroxide, may vary from about 1 part hydrogen peroxide to 20 parts metal compound, to about 4 parts hydrogen peroxide to 1 part metal compound and preferably is from about .2 to about 2 parts of peroxide per part of metal compound.

A solvent may be employed as a reaction medium although such is not essential. One is particularly desirable when very viscous phosphorous sulfide-hydrocarbon reaction products are employed. Solvents such as light paraffin, e. g., hexane, etc., or aromatics such as benzene are suitable for this purpose.

For purposes of illustrating the present invention, the following specific examples are set forth. In these examples, unless otherwise specified, quantities of reactants, etc., are given in parts by weight.

*Example I*

A mixture of 900 grams of $P_2S_5$ and 2100 grams of a butylene-isobutylene polymer having specific gravity 60/60 of 0.831, a viscosity of 114 S. S. U. at 100° F. and a refractive index ($n_D^{20}$) of 1.4655 and which had been obtained by polymerizing a mixture of $C_4$ olefins and paraffins, as hereinbefore described, was stirred at 350° F. for 4½ hours followed by steaming at 300° F. for 6 hours and claying with 300 grams of Attapulgus clay fines at 300° F. for 1½ hours. The final product was then filtered through celite. The product contained 8.1% phosphorus, 5.7% sulfur, and had an acidity of 148 mg. KOH/g., a molecular weight of 875, and a viscosity at 210° F. of 2934 S. S. U. Four hundred thirty-six grams of this phosphorous sulfide-hydrocarbon reaction product, 300 ml. of benzene, and 110 grams of $MoO_3$ were stirred and to the mixture was added 135 ml. of 30% aqueous hydrogen peroxide, dropwise over a period of 2 hours. The temperature rose from about 77° F. to about 147° F. during this time. Stirring of the reaction mixture was continued for another 30 minutes after which the mixture was filtered through celite and evaporated at 250° F. while blowing with nitrogen. The deep blue viscous product (448 grams) contained 6.22% phosphorus and 7.17% molybdenum. The product was readily soluble in hydrocarbon solvents and in mineral oil.

*Example II*

To a stirred mixture of 345 grams of the unneutralized $P_2S_5$-butylene-isobutylene polymer reaction product prepared in Example I, 200 ml. of benzene and 43.5 grams of $V_2O_3$ were added 111 ml. of 30% aqueous hydrogen peroxide dropwise over a 3-hour period. The temperature rose from about 77° F. to about 150° F. The mixture was stirred for an additional 15 minutes, filtered through celite, and evaporated at 250° F. while blowing with nitrogen. The green, viscous product (349 grams) contained 6.17% phosphorus and 3.08% vanadium. It likewise was freely soluble in hydrocarbon solvents and in mineral oil.

*Example III*

A mixture comprising 85% of an isobutylene polymer, having a mean molecular weight of about 780, a viscosity of 1010 S. S. U. at 210° F., a specific gravity of .881 and obtained by polymerizing a mixture of $C_4$ olefins and paraffins, as hereinbefore described, and 15% of $P_2S_5$ was reacted for six hours at 400° F. and the resulting product was thereafter hydrolyzed in the presence of steam at 400° F.; after claying the hydrolyzed product and diluting with oil, a final material was obtained which had a concentration of phosphorous and sulfur-containing compound of 60%. 332 parts of his phosphorous sulfide-hydrocarbon reaction product, 175 parts of benzene and 19 parts of molybdenum trioxide were then vigorously agitated while 72 parts of hydrogen peroxide (30% aqueous solution) were added dropwise over a two-hour period. The reaction was exothermic, the temperature rising in the range of from about 110° F. to about 125° F. and resulted in a yellow mixture. This mixture was then refluxed for two hours and water was removed. During the course of refluxing, the product became dark blue in color. Substantially all of the molybdenum oxide dissolved, after which a blue benzene solution was decanted from the trace of unreacted molybdenum oxide and the benzene was stripped off in the vacuum at 200° F. The resulting product comprised 350 parts of a dark blue viscous product which was found to be entirely oil soluble. It analyzed 4.86% molybdenum, and 1.87% phosphorus.

*Example IV*

1100 parts of polymer resulting from the polymerization of a mixture of butylenes having a mean molecular weight of 330 and a specific gravity of .831, and 330 parts of P₂S₅ were reacted at 400 to 420° F. for 4 hours following which the product was steamed at 300° F. for 4 hours, then dried. A mixture of 109 parts of this product and 22.5 parts of vanadium trioxide was stirred. To this mixture were added 10.9 parts of hydrogen peroxide (30% aqueous solution) dropwise. Considerable heat was evolved and the mixture turned green. Hexane was added, the mixture was centrifuged, and the clear liquid decanted and evaporated in vacuo to give 105 parts of a dark green, viscous, oil-soluble product analyzing 3.09% vanadium and 5.13% phosphorus.

*Example V*

A mixture of 50 parts P₂S₅-polybutylene reaction product prepared as in Example IV, 16 parts molybdenum sulfide and 75 cc. benzene was stirred while 6.8 parts of a 30% aqueous hydrogen peroxide were added dropwise. The mixture turned yellow and became hot. Stirring was continued for 4 hours, 200 cc. hexane was added, the hexane solution filtered and evaporated on the steam bath, giving 51 parts viscous dark green oil-soluble product analyzing 0.84% molybdenum and 2.27% phosphorus.

*Example VI*

850 parts of polymer from polymerization of a butylene mixture and having a mean molecular weight of 250, and 150 parts P₂S₅ was reacted at 400° F. for 4 hours, then steamed at 300° F. for 4 hours, and dried by blowing with nitrogen at 300° F. for 1 hour. A mixture of 50 parts of this product, 10.5 parts ammonium molybdate ((NH₄)₆Mo₇O₂₄·4H₂O), and 50 cc. benzene was stirred while 6.8 parts of 30% hydrogen peroxide were added dropwise. The mixture became warm and yellow. It was stirred for 4 hours, then evaporated on the steam bath. The residue was taken up in 250 cc. hexane, the hexane solution filtered and evaporated on the steam bath, giving 52 parts viscous intensely-blue oil-soluble product analyzing 3.74% molybdenum and 2.45% phosphorus.

*Example VII*

A mixture of 36.5 parts P₂S₅-polyisobutylene product of Example IV, 14.4 parts molybdenum trioxide and 35 cc. benzene were stirred while 4.4 parts of 30% hydrogen peroxide were added dropwise. The mixture became warm and yellow. 100 cc. of hexane were added, the mixture was centrifuged and the clear decanted hexane layer evaporated up to 280° F. The residue, 38.5 parts, was a viscous deep blue oil-soluble liquid analyzing 8.84% molybdenum and 3.47% phosphorus.

It has been found that larger amounts of molybdenum and vanadium will be contained in complexes prepared from phosphorous sulfide-hydrocarbon reaction products prepared from polymers having relatively low molecular weights. Thus, with isobutylene polymers having mean molecular weights in the range of from about 300 to about 500, it has been found that substantially more molybdenum oxide will be present in complexes embodying the same, and consequently greater amounts of molybdenum may be incorporated in the product, than is the case of polymers having higher molecular weight, e. g., of about 1000. The variation in the amount of metal incorporated, however, is both slight and very gradual as the molecular weight increases or decreases. In accordance herewith, when referring to "unneutralized phosphorous sulfide-hydrocarbon reaction products," either in the specification or appended claims, it shall mean such phosphorous sulfide-hydrocarbon reaction products as described herein which have not had as much as 1% of their titratable acidity neutralized by reaction with a basic reagent.

The products of Examples I and II above were tested in the spore germination test using peach brown rot (*Sclerotinia fructicola*) and early blight (*Alternaria solarii*). The tests employed were of the screening variety and the products were classified as excellent in that both inhibited the germination of at least 50% of the spores in concentrations of 25 mg. per liter or less. The spore germination test ("Fungicides and Their Action," J. G. Horsfall, Chronica Botanica Co., Waltham, Mass., 1945) consists of placing a spore suspension of an organism (e. g. *Sclerotinia fructicola*) and a nutrient in various dilutions of the test chemical and allowing the spores to germinate in a moist chamber for 16 to 20 hours. The spores are then examined under the microscope and the percent of spores containing no germ tubes recorded. Percent germination is then plotted against concentration on a logarithmic probability paper. LD (lethal dosage) values can be read directly from the curve. A so-called class "A" fungicide is one that inhibits 50% of the spores at a concentration of 25 mg. or less per liter. Moreover, both compounds were completely harmless (non-phytotoxic) to the leaves and blossoms of apples and tomatoes as well as string beans and wheat. In field tests employing the products of Examples I and II above on tomatoes, the control of early blight and inhibition of Anthracnose were determined. In the table are set forth the results of field tests employing concentration of ½ pound of active fungicide in 100 gallons of water. Spraying was done at the rate of about 200 gallons per acre.

|  | Percent Early Blight Control | Anthracnose | |
|---|---|---|---|
|  |  | Percent Clean | No. of Lesions/ 50 Fruits |
| Untreated | 70 | 30 | 405 |
| Compound, Example I | 77 | 46 | 306 |
| Compound, Example II | 93 | 60 | 148 |

The heavy metal containing compositions of the present invention are employed in varying amounts and concentrations, depending upon the particular crop or plant being treated. The stage of growth of the plant will also determine the amount of fungicide and, consequently, the concentration in the carrier. Generally speaking, however, an amount of from about 1 pound to about 16 pounds per acre may be employed with a preferred application being from about 2 to about 6 pounds per acre.

Thus, fungicidal compositions comprising, as the active ingredient, the heavy metal containing phosphorous sulfide-hydrocarbon reaction products described herein, should contain from about 0.05 to about 1% and preferably 0.1 to about 0.4% by weight of such active material. The remainder of the composition may comprise non-phytocidal carriers such as dusts, organic solvents, aqueous dispersions or any of the other carriers frequently employed in the art such as refined petroleum oil fractions lower boiling than lubricating oils. The percentage of active material employed in a dust is ordinarily greater than that in a liquid composition. They may, of course, be employed in combination with other known fungicides and they may, if desired, be applied directly to the fungus without benefit of a carrier although such technique is not ordinarily desirable.

Having thus described our invention, what we claim as novel and desire to protect by Letters Patent is as follows:

1. The method of controlling fungi on vegetables, fruits and field crops, which comprises contacting said fungi with a composition consisting essentially of a fungicidally active material resulting from the reaction at a temperature of from about 25° F. to about 200° F. of (1) a molybdenum oxide, (2) an acidic phosphorous sulfide-hydrocarbon reaction product and (3) hydrogen peroxide, said three components of the reaction being used in the approximate proportions based upon one part of component (1), of 1 to 40 parts of component (2), and 0.05 to 4 parts of component (3), and said acidic phosphorous sulfide-hydrocarbon reaction product being obtained by reacting from about 1% to about 50% of a phosphorous sulfide with the hydrocarbon at a temperature of from about 200° F. to about 600° F., and a substantially greater amount of a non-phytocidal carrier therefor, selected from the group consisting of a dust, an aqueous dispersion and a refined petroleum fraction lower boiling than lubricating oils, said composition being applied at a rate of from about 1 to about 16 pounds of said fungicidally active material per acre.

2. The method of controlling fungi on vegetables, fruits and field crops, which comprises contacting said fungi with a composition consisting essentially of a fungicidally active material resulting from the reaction at a temperature of from about 25° F. to about 200° F. of (1) a molybdenum sulfide, (2) an acidic phosphorous sulfide-hydrocarbon reaction and (3) hydrogen peroxide, said three components of the reaction being used in the approximate proportions based upon one part of component (1), of 1 to 40 parts of component (2), and 0.05 to 4 parts of component (3), and said acidic phosphorous sulfide-hydrocarbon reaction product being obtained by reacting from about 1% to about 50% of a phosphorous sulfide with the hydrocarbon at a temperature of from about 200° F. to about 600° F., and a major amount of a non-phytocidal carrier therefor, selected from the group consisting of a dust, an aqueous dispersion and a refined petroleum fraction lower boiling than lubricating oils, said composition being applied at a rate of from about 1 to about 16 pounds of said fungicidally active material per acre.

3. The method of controlling fungi on vegetables, fruits and field crops, which comprises contacting said fungi with a composition consisting essentially of a fungicidally active material resulting from the reaction at a temperature of from about 25° F. to about 200° F. of (1) a salt of molybdic acid with a weak base having a dissociation constant no greater than about $1 \times 10^{-3}$, which acid forms an oxide of the respective metal under said reaction conditions, (2) an acidic phosphorous sulfide-hydrocarbon reaction product and (3) hydrogen peroxide, said three components of the reaction being used in the approximate proportions based upon one part of component (1), of 1 to 40 parts of component (2), and 0.05 to 4 parts of component (3), and said acidic phosphorous sulfide-hydrocarbon reaction product being obtained by reacting from about 1% to about 50% of a phosphorous sulfide with the hydrocarbon at a temperature of from about 200° F. to about 600° F., and a major amount of a non-phytocidal carrier therefor, selected from the group consisting of a dust, an aqueous dispersion and a refined petroleum fraction lower boiling than lubricating oils, said composition being applied at a rate of from about 1 to about 16 pounds of said fungicidally active material per acre.

4. The method of controlling fungi on vegetables, fruits and field crops, which comprises contacting said fungi with a composition consisting essentially of a fungicidally active material resulting from the reaction at a temperature of from about 25° F. to about 200° F. of (1) a vanadium sulfide, (2) an acidic phosphorous sulfide-hydrocarbon reaction product and (3) hydrogen peroxide, said three components of the reaction being used in the approximate proportions based upon one part of component (1), of 1 to 40 parts of component (2), and 0.05 to 4 parts of component (3), and said acidic phosphorous sulfide-hydrocarbon reaction product being obtained by reacting from about 1% to about 50% of a phosphorous sulfide with the hydrocarbon at a temperature of from about 200° F. to about 600° F., and a major amount of a non-phytocidal carrier therefor, selected from the group consisting of a dust, an aqueous dispersion and a refined petroleum fraction lower boiling than lubricating oils, said composition being applied at a rate of from about 1 to about 16 pounds of said fungicidally active material per acre.

5. The method of controlling fungi on vegetables, fruits and field crops, which comprises contacting said fungi with a composition consisting essentially of a fungicidally active material resulting from the reaction at a temperature of from about 25° F. to about 200° F. of (1) a vanadium oxide, (2) an acidic phosphorous sulfide-hydrocarbon reaction product and (3) hydrogen peroxide, said three components of the reaction being used in the approximate proportions based upon one part of component (1), of 1 to 40 parts of component (2), and 0.05 to 4 parts of component (3), and said acidic phosphorous sulfide-hydrocarbon reaction product being obtained by reacting from about 1% to about 50% of a phosphorous sulfide with the hydrocarbon at a temperature of from about 200° F. to about 600° F., and a major amount of a non-phytocidal carrier therefor, selected from the group consisting of a dust, an aqueous dispersion and a refined petroleum fraction lower boiling than lubricating oils, said composition being applied at a rate of from about 1 to about 16 pounds of said fungicidally active material per acre.

6. The method of controlling fungus on vegetables, fruits, and field crops which comprises contacting said fungus with a composition consisting essentially of a fungicidally active material resulting from the reaction at a temperature of from about 25° F. to about 200° F. of (1) a compound selected from the group consisting of the oxides and sulfides of molybdenum and vanadium and salts of molybdic and vanadic acids with weak bases having a dissociation constant less than about $1 \times 10^{-3}$ which sulfides and acid form an oxide of the respective metal under said reaction conditions, (2) an acidic phosphorous sulfide-hydrocarbon reaction product, and (3) hydrogen peroxide, said three components of the reaction being used in the approximate proportions based upon one part of component (1), of 1 to 40 parts of component (2), and 0.05 to 4 parts of component (3), and said acidic phosphorous sulfide-hydrocarbon reaction product being obtained by reacting from about 1% to about 50% of a phosphorous sulfide with the hydrocarbon at a temperature of from about 200° F. to about 600° F., and a substantially greater amount of a non-phytocidal carrier therefor selected from the group consisting of a dust, an aqueous dispersion and a refined petroleum fraction lower boiling than lubricating oils, said composition being applied at a rate of from about 1 to about 16 pounds of said fungicidally active material per acre.

7. The method of claim 6 wherein the unneutralized phosphorous sulfide-hydrocarbon reaction product was prepared by reacting $P_2S_5$ with a copolymer of butylene and isobutylene.

References Cited in the file of this patent

UNITED STATES PATENTS

| | | |
|---|---|---|
| 2,724,718 | Stiles et al. | Nov. 22, 1955 |
| 2,758,089 | Hoff et al. | Aug. 7, 1956 |